United States Patent [19]

Roberts et al.

[11] Patent Number: 4,458,984

[45] Date of Patent: Jul. 10, 1984

[54] ASSEMBLY FOR THERMALLY ACTUATED OPTIC FIBER JOINTING DEVICE

[75] Inventors: Harold A. Roberts, North Attleboro; Robert A. Wey, Plainville, both of Mass.

[73] Assignee: Augat Inc., Mansfield, Mass.

[21] Appl. No.: 304,328

[22] Filed: Sep. 21, 1981

[51] Int. Cl.³ .............................................. G02B 7/26
[52] U.S. Cl. .................................................. 350/96.21
[58] Field of Search ................ 350/96.20, 96.21, 96.22

[56] References Cited

U.S. PATENT DOCUMENTS

| 4,261,644 | 4/1981 | Giannaris | 350/96.21 |
| 4,261,774 | 4/1981 | Lewis et al. | 350/96.21 X |
| 4,281,892 | 8/1981 | Sitabkhan | 350/96.21 |
| 4,352,542 | 10/1982 | Tydings | 350/96.21 |

FOREIGN PATENT DOCUMENTS

| 1524751 | 9/1978 | United Kingdom | 350/96.21 |
| 1555475 | 11/1979 | United Kingdom | 350/96.21 |
| 1580061 | 11/1980 | United Kingdom | 350/96.21 |

OTHER PUBLICATIONS

Carlsen, "An Elastic-Tube Fiber Splice", *Laser Focus,* vol. 16, No. 4, Apr. 1980, pp. 58–62.

*Primary Examiner*—John D. Lee
*Attorney, Agent, or Firm*—Weingarten, Schurgin, Gagnebin & Hayes

[57] ABSTRACT

An assembly for end-to-end coupling, and decoupling, of optical fibers in which the fibers are captured in a selectively expandable channel defined between a plurality of thermally actuated, shape memory vanes. The vanes are configured to provide flared ends to the channel that guide optical fibers into the channel from a precision groove in a surrounding casing. The fibers are retained within the groove of the casing by a leaf spring that prevents deflection of the fibers while holding them in place until the channel contracts around them. The thermally actuated, shape memory vanes are contained within a collar that provides a spring bias which maintains the contracted channel size at room temperature when the vanes are not thermally activated to thus securely capture and hold the optical fibers. The vanes, as an alternative, may be coated with a resilient material that adapts the channel dimensions to slightly different fiber diameters, providing exact fiber centering within the channel. The collar for the vanes is loosely fitted into a surrounding housing which limits the expansion of the channel to a predetermined size to prevent fibers from slipping out of the channel during insertion. The housing further helps to distribute the activating heat evenly around the collar, to the vanes.

26 Claims, 9 Drawing Figures

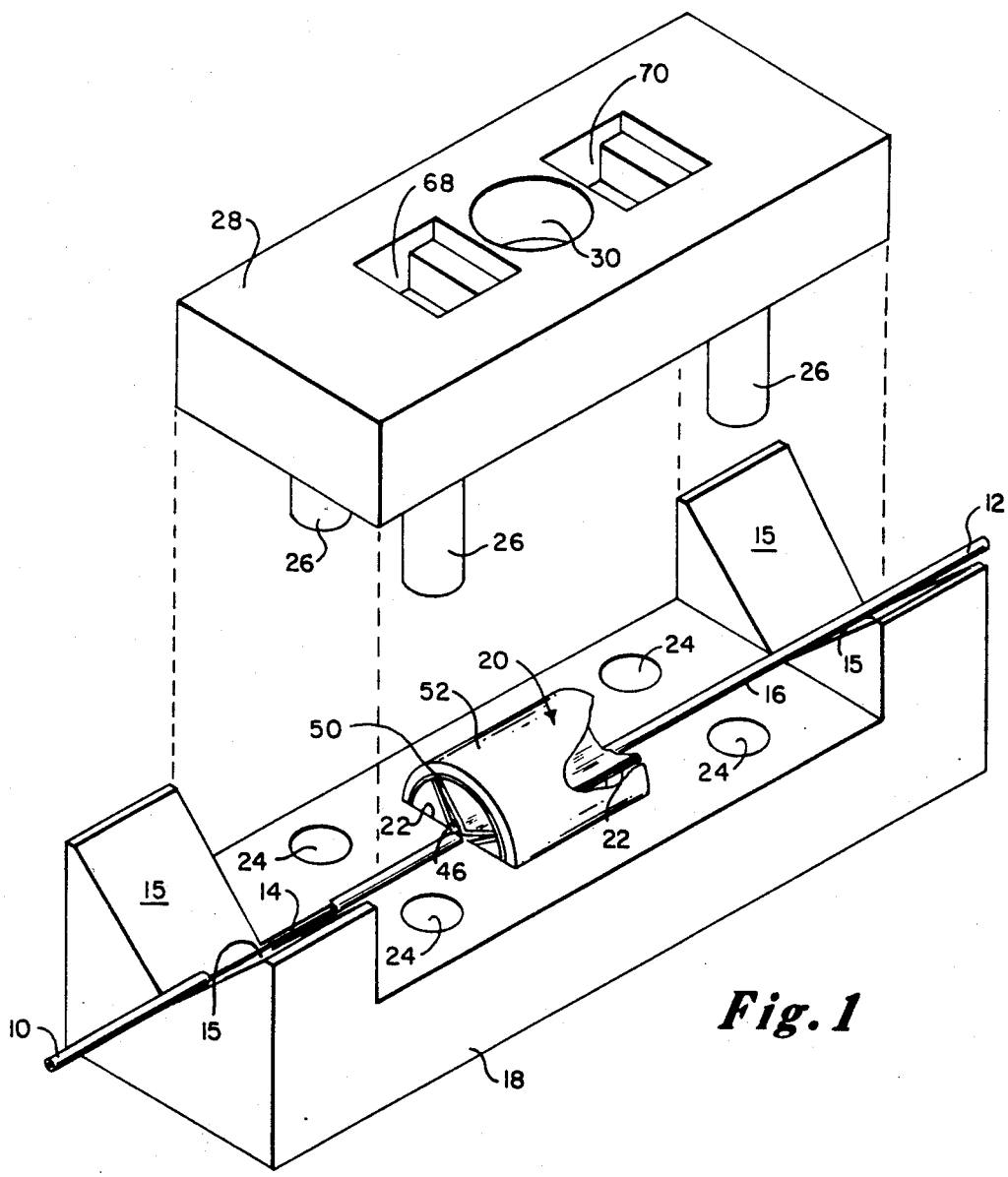
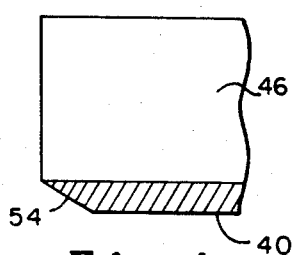
Fig.4
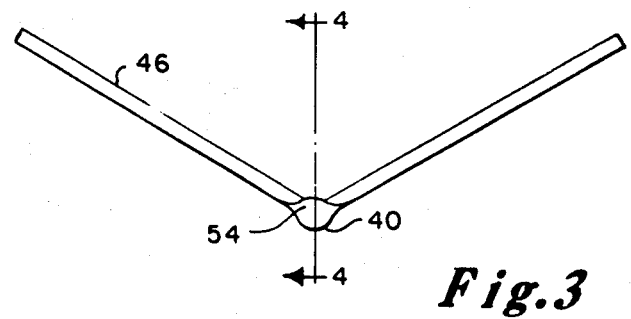
Fig.3 Fig.1

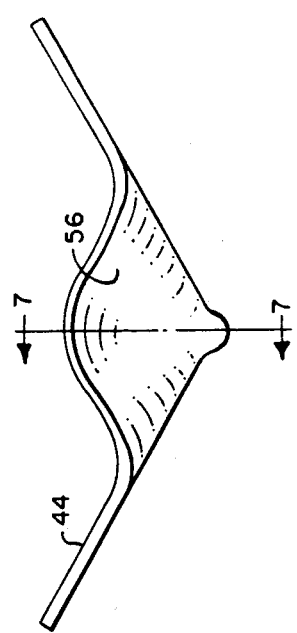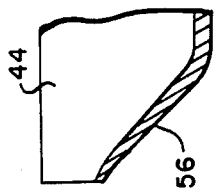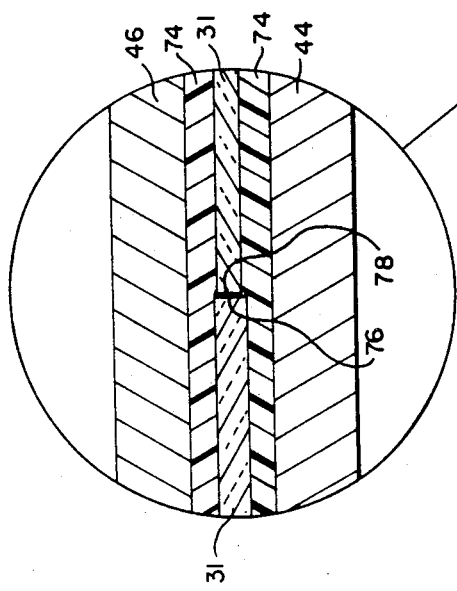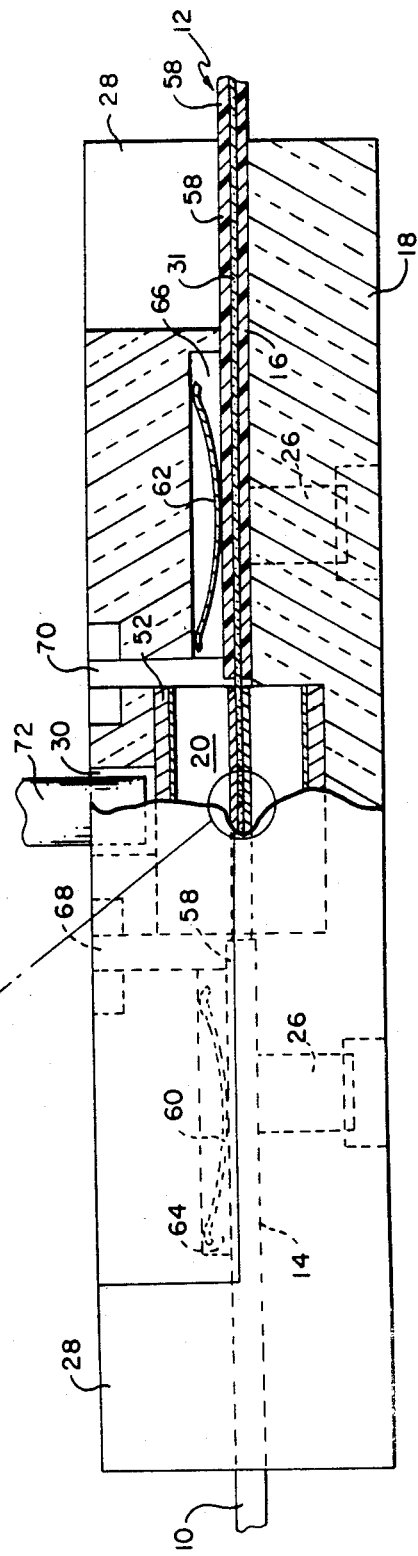

ASSEMBLY FOR THERMALLY ACTUATED OPTIC FIBER JOINTING DEVICE

FIELD OF THE INVENTION

The present invention relates to jointing devices for optical fibers and in particular to the jointing devices which permit fiber insertion and removal.

BACKGROUND OF THE INVENTION

Optical fibers used to carry many channels of information modulated light must often be joined on an end-to-end basis to couple the light from one fiber to another. Such jointings may be either permanent or provided in a manner which permits repeated connect and disconnect operations. Among the latter there exists a need for easy to operate jointing mechanisms, typically for use in the field by installers of optical fiber transmission lines. Field installation of cables, however, while not only difficult, increases the risk of fiber end contamination that reduces optical coupling efficiency.

One system which appears promising in such applications employs shape memory materials such as a nickel-titanium alloy. This material is capable of memorizing its shape when annealed at high temperatures, such as 500° C. At room temperature the material may be deformed into another shape, but upon reheating to a predetermined temperature range will attempt to return to its shape at annealing even though restrained by a spring force. Upon subsequent cooling, the spring force returns the material to the deformed shape. This property has been utilized to provide optical fiber jointing by employing it in the fabrication of three V-shaped vanes which are set within a resilient collar defining a channel, at the apexes of the vanes. The channel can be selectively expanded by the application of heat to the vanes causing them to seek a less sharply angled shape memorized into the vanes at annealing. The expanded channel permits insertion of optical fibers from opposite ends which are subsequently captured within the channel when it contracts after the removal of heat. The channel design has an advantage in minimizing the risk of the fiber ends collecting debris during insertion, thus improving the chance for a high efficiency coupling.

While such apparatus appears useful for the coupling of optical fibers, the demands of the field environment where installers are required to make repeated splices and to uncouple and recouple fibers places demands upon such a jointing device which it is not by itself capable of meeting. One of the problems which field installers must face is the possibility of slight differences in optical fiber diameter between the two fibers being coupled. In this case, the collapsing channel will rigidly secure the end of the larger fiber but permit the smaller fiber to be less accurately seized at its end, permitting fiber misalignment that reduces the coupling between fibers. In addition, great care is required in the application of heat to the shape memory vanes to prevent over expansion of the channel to the extent that fibers slip between the sides of the vanes and further to prevent over stressing of the device from excessive heat. In addition, the channel diameter, even when expanded by heat, is exceedingly small, making field insertion of the fibers from each end a difficult, needle threading function. Even if one is successful in inserting the fibers from each end, there remains the problem of maintaining the fibers in end-to-end or near end-to-end contact during the cooling cycle of the shape memory material until it contracts the channel to capture the two fibers in proper end contacting relationship.

BRIEF SUMMARY OF THE INVENTION

In accordance with the teaching of the present invention, an optical fiber jointing device is provided utilizing shape memory materials in a plurality of V-shaped vanes held within a collar with their apexes having a ridge extending the length of the apex to define a small diameter channel, sized to capture the optical fibers. The vanes are surrounded by a resilient collar which holds the vanes in place and provides a spring bias for restoring the channel to its small dimension after it is thermally activated to permit fiber insertion. The problem of over expansion of the shape memory vanes is overcome by installing a strong, restraining cylindrical housing around the collar. The collar loosely fits within the housing at room temperature, but the housing limits the expansion of the vanes against the collar when heated, thus limiting channel expansion. The housing further provides a heat sink for the even application of heat, as by an electrically heated iron, to the collar and vanes.

The housing is contained within a two part casing having top and bottom portions which fasten together to capture the housing within and provide thermal insulation against the loss of heat, enhancing the uniformity of its application to the vanes. The casing has precisely located grooves that guide optical fibers through the casing directly toward the channel, in its expanded condition, to facilitate fiber insertion therein. The ends of the vanes in the regions defining the channel are preferably flared either by chamferring or the use of a reverse bend in the vane material to further guide the optical fibers into the channel in the thermally expanded mode.

The optical fibers, before insertion, have the plastic buffer around the glass fiber stripped back as far as the fiber is to be inserted in the channel. Leaf springs contact the plastic buffer to hold the fiber within the casing grooves on either side of the channel so that after insertion of the fibers into the channel in the thermally expanded condition, they are held in place during cooling of the vanes. The cooled vanes contract the channel about the fibers, finally capturing them in place. The leaf springs are further configured and positioned to avoid contact with the glass fibers themselves as the fiber is inserted along the groove into the channel.

The surfaces of the vanes where they define the channel and contact the exposed glass fibers in the contracted channel state may alternatively be coated with a layer of a resilient material which responds to fibers of differing diameters, insuring that the terminations of such fibers are equally gripped and centered in alignment within the channel for optimal light coupling therebetween.

DESCRIPTION OF THE DRAWING

These and other features of the present invention are more fully set forth in the solely exemplary preferred embodiment described in detail below and in the accompanying drawing of which:

FIG. 1 is a partially exploded view of an optical fiber connector assembly in accordance with the present invention;

FIG. 3 is an end view of a shape memory vane used in the present invention;

FIG. 4 is a partially sectional view of the vane of FIG. 3 along section lines there indicated;

FIG. 6 is an end view of an alternative vane configuration in accordance with the present invention;

FIG. 7 is a sectional view of the vane of FIG. 6;

FIG. 8 is a partially sectional, partially phantom view of an optical fiber jointing device assembly of the present invention; and FIG. 9 is a magnified view of the region of optical fiber coupling within the channel defined between shape memory vanes in accordance with the present invention.

DETAILED DESCRIPTION

Figure 2:
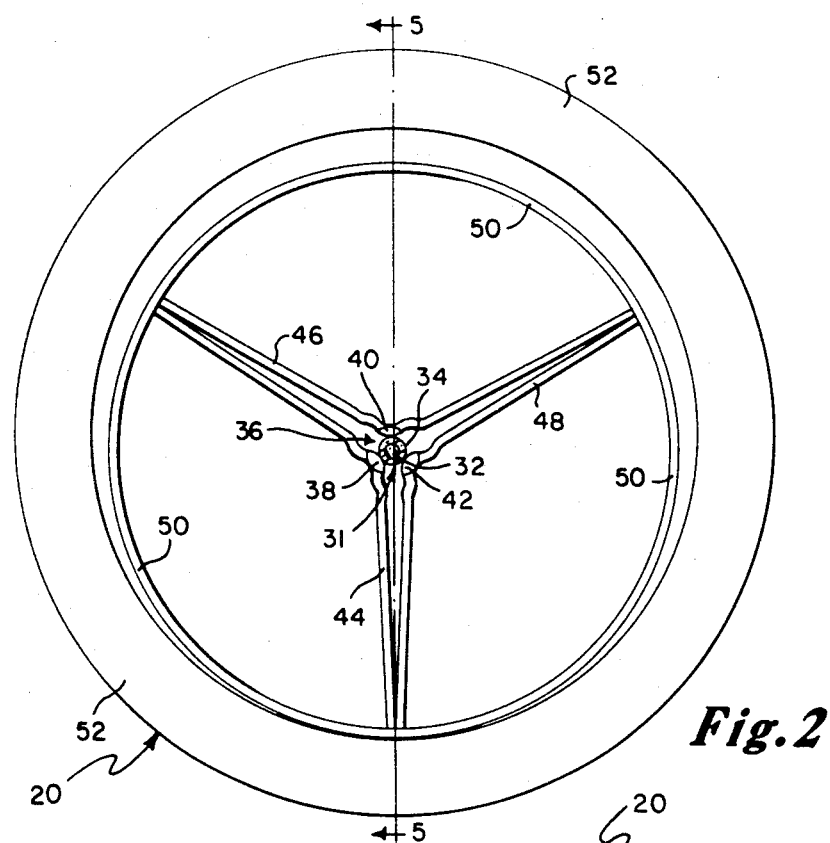
FIG. 2 is an end view of assembled vanes, and surrounding collar and housing, gripping an optical fiber in accordance with the present invention.
Figure 5:
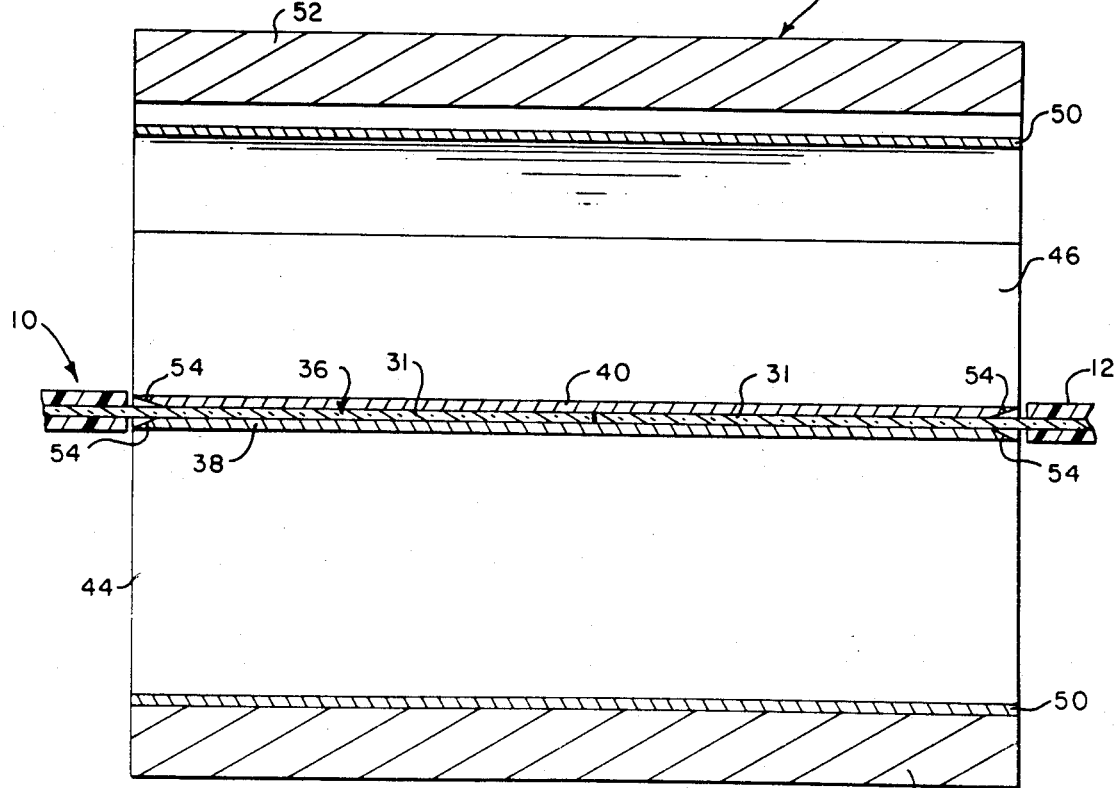
FIG. 5 is a side sectional view of the vane and collar of FIG. 2.

The present invention contemplates a field useable optical fiber connector adapted to permit field splicing of cables utilizing thermally actuated shape memory material for selective fiber insertion and retention. A jointing device assembly for such use is illustrated in partially exploded view in FIG. 1. As shown there, first and second optical fibers 10 and 12 are laid within respective grooves 14 and 16 of a base 18. The grooves 14 and 16 terminate in large V-shaped shoulders 15 that define the entrance to each groove to facilitate fiber insertion. The optical fibers 10 and 12 have the outer plastic buffer layers in place surrounding the glass core where they travel within the grooves 14 and 16, but have the plastic buffer stripped from the fiber at the point where the fibers 10 and 12 enter a connector assembly 20. The assembly 20 is placed within a V-shaped trough 22 of the base 18. The V-shaped trough 22 is precisely aligned in accordance with the dimensions of the connector assembly 20 and the grooves 14 and 16 to direct the glass core of the optical fibers 10 and 12 directly into the center, mating region of the assembly 20, as explained more fully below. The view of fiber 10 has the plastic buffer shown partially removed to illustrate the fiber within.

The base 18 further contains a set of holes 24 which receive pegs 26 on a top member 28 which is designed to fit over the base 18 holding the assembly 20 in place between the trough 22 and a corresponding aperture, not shown, in the top 28. The top 28 additionally contains an aperture 30 which, when the top 28 is installed into the base 18, permits access to the assembly 20 by a heating tool for purposes to be described below. The base 18 and top 28 are typically formed of a high heat deflection plastic, examples of which are TORLON (Registered Trademark of Amoco Chemical Corporation) and VALOX (Registered Trademark of The General Electric Company).

The connector assembly 20 is more fully illustrated in FIGS. 2, 3, 4 and 5. In FIG. 2, an end view of the assembly 20 shows the glass portion of an optical fiber 31, typically having an inner glass core 32 and an outer glass cladding 34, captured within a channel 36 defined by protruding ridges 38, 40, and 42 at the apexes of respective V-shaped vanes 44, 46 and 48. The vanes 44, 46 and 48 are captured at their ends within a collar 50 which is in turn surrounded by a loosely fitting cylinder or housing 52. The vanes 44, 46 and 48 are of a nickel-titanium alloy and are annealed at a less sharply angled V form, up to 180° in angle, at a high temperature, typically 500° C., which shape is memorized into the microstructure of the vanes. The vanes are subsequently bent to the form illustrated in FIG. 2 and inserted within the collar 50. Collar 50 is typically a good spring metal such as beryllium copper. Upon heating of the vanes to their transition temperature range, a temperature well below the annealing temperature, the vanes will attempt to return to their memorized shape at annealing, forcing the collar 50 outward at the three points of contact into a three cusped form. As the vanes 44, 46 and 48 tend to straighten out, the diameter of the channel 36 formed between their apexes enlarges beyond the diameter of the optical fiber 31 permitting its insertion or withdrawal. The surrounding cylinder 52 limits the extent to which the vanes are permitted to straighten out, thereby limiting the opening of the channel 36. This is desirable to avoid overstressing of the vanes of collar 50 and to prevent the space between the vanes from opening up to the point where the optical fiber 31 can slip out of the channel 36 into the region between the vanes. The cylindrical housing 52 is typically of a high thermal conductivity material, such as aluminium, of a sufficient size to resist further expansion of the collar 50 and to rapidly distribute heat around the collar 50 and vanes 44, 46 and 48.

In the view of FIG. 2 the collar 50 is illustrated as fitting, in the cooled state, loosely within the cylinder 52. Upon heating, the collar tightly fits the cylinder 52 with the expanded channel 36 along its central axis. The locations of the grooves 14 and 16, in conjunction with the position of the cylinder 52 within the trough 22 of FIG. 1, are all provided to align the channel 36 directly with the location of the glass portion of the optical fibers 10 and 12 residing within the grooves 14 and 16. Even so, because of the small dimensions of the channel 36, insertion of a fiber into the expanded channel 36 can be difficult. For this purpose, the ends of the vanes 44, 46 and 48 at the ridges 38, 40, and 42 of their apexes are flared by chamferring to define funneling guide surfaces, such as surfaces 54 illustrated more clearly in FIGS. 3 and 4, and in sectional view in FIG. 5 which shows fully inserted glass elements of the optical fibers 10 and 12. The flaring of the apexes of the vanes greatly facilitates the insertion, given the precise alignment between the expanded channel 36 and the glass centers of the optical fibers, held within the grooves 14 and 16.

Alternatively, to obtain a channel guide function, the ends of the vanes 44, 46, 48 at the ridges 38, 40, and 42 of their apexes may be overstressed and bent back upon themselves to define a reverse curve portion 56 as illustrated in FIGS. 6 and 7. Because the vanes have been overstressed in being bent back in such a shape, they will not react to heating to the transitional temperature range to resume the normal V shape as does the rest of the vane.

With reference now to FIGS. 8 and 9, further details of the jointing device connector of the present invention are illustrated. FIG. 8 shows a partially sectional and partially phantom view of a closed and assembled case consisting of top 28 and base 18 with the optical fibers 10 and 12 fully installed therein. The fibers 10 and 12 have the plastic buffer 58 removed beyond the point of insertion into the connector assembly 20 exposing the inner glass fiber 31, typically formed of the glass core surrounded by a glass cladding. The fibers 10 and 12 are held within the grooves 14 and 16 by respective leaf springs 60 and 62 having curved centers resiliently urged against the plastic buffer 58. The springs 60 and 62 have a width typically greater than the width of the grooves 14 and 16 so that at no point in the insertion of the fibers 10 and 12 does the glass portion 31 come in contact with the springs 60 or 62. For this purpose the grooves 14 and 16 are also sufficiently deep that the portion of the fiber stripped of plastic buffer 58, i.e., the glass portion 31, rides well below the lip of the grooves during insertion of the fibers 10 and 12. The springs 60 and 62 reside within cavities 64 and 66 in the top 28 and are urged downward by contact with the roof of the cavities. The top 28 also is provided with inspection ports 68 and 70 which permit viewing of the point of entry of the fibers 10 and 12 into the connector assembly 20 to verify full insertion.

In coupling optical fibers with the jointing device of the present invention, one fiber is installed into the assembly 20 using ports 68 or 70 to verify insertion. The second fiber is then inserted from the other end until the fiber end noticeably contacts the first fiber end and pushes it back slightly, insuring end-to-end contact. The springs 60 and 62 apply a force sufficient to hold this end-to-end contact while the assembly 20 cools but also permits the pushing of one fiber by the other.

The point of contact of the springs 60 and 62 is sufficiently far away from assembly 20 to avoid a deflecting force on the fiber at the point where it enters the connector assembly 20. It may be additionally desirable to provide the grooves 14 and 16 in a serpentine pattern to further capture the fibers 10 and 12 in the grooves of the base member 18. Such a pattern of grooves can be used in lieu of springs 60 and 62. In order to provide verification of the expansion of the channel 36 from heating of the assembly 20, it may be desirable to install on the top 28 or base 18 a chemical or other thermal indicator in thermal contact with the connector assembly 20 to indicate when the assembly 20 is hot enough for the channel 36 to be fully opened as well as when the assembly 20 has cooled to fully contract channel 36.

In the view of FIG. 8, a heating element 72, such as an appropriately tipped iron, is inserted within the aperture 30 to contact the aluminium housing cylinder 52 and apply heat throughout the assembly 20 in order to expand the channel 36.

Since the inner glass portion 31 of the optical fiber may vary somewhat in diameter, it is possible that the central axes of the fibers 10 and 12 at their terminations within the assembly 20 may not be perfectly in line. The vanes 44, 46 and 48 are optionally provided with a coating of a resilient material, at least at the ridges of their apexes where they define the channel 36 and capture the glass portion 31 of the fibers 10 and 12. As illustrated in FIG. 9, optional resilient liners 74, typically of a thickness less than the diameter of the glass portion 31, are applied on the vanes 44 and 46, as well as vane 48 not shown. The liner 74 may be of a material like TEFLON (Tetrafluoroethylene) (Registered Trademark of E. I. duPont de Nemours and Company) which will deform slightly to accommodate the different diameters of the glass portions 31, providing an exact alignment between their central axes in the captured mode of the assembly 20. As shown, the ends 76 and 78 of the fibers 10 and 12 are typically cleaved flat and perpendicular to their axes and are in actual physical contact.

The optical fiber jointing device of the present invention, as described above, provides for a practical method of connecting and disconnecting optical fibers by facilitating their insertion into a selectively expandable channel, held in a precisely defined location with respect to a locating groove for the fibers and by insuring precise axial alignment of fibers of differing diameters once captured within the connector. It should be noted that other embodiments for accomplishing the invention may be developed without departing from the spirit and scope of the invention as defined in the following claims.

What is claimed is:

1. A thermally actuated fiber optic jointing device comprising:
   a flexible collar;
   a plurality of generally V-shaped vanes within said collar positioned with apexes thereof facing inward to form a passageway selectively expandable against the flex of said collar in response to a condition to permit the insertion into said passageway of first and second optical fibers from opposite ends with said passageway contracting with the removal of said condition to grasp said optical fibers between the apexes of said vanes;
   the surfaces of said vanes at the ends thereof, in the portions defining said passageway, being individually sloped away from said passageway and being cooperative to provide a segmented conical flare at the entrance to said passageway;
   a resilient coating on the surface of said vanes at the apexes facing said passageway which deforms against the pressure of said first and second optical fibers inserted in said passageway when said passageway is contracted.

2. A thermally actuated fiber optic jointing device comprising:
   a flexible collar;
   a plurality of generally V-shaped vanes within said collar positioned with apexes thereof facing inward to form a passageway selectively expandable against the flex of said collar in response to a condition to permit the insertion into said passageway of first and second optical fibers from opposite ends with said passageway contracting with the removal of said condition to grasp said optical fibers between the apexes of said vanes;
   the surfaces of said vanes at the ends thereof, in the portions defining said passageway, being individually sloped away from said passageway and being cooperative to provide a segmented conical flare at the entrance to said passageway;
   a removable casing for holding said collar;
   said casing including a grooved guideway for directing said first and second optical fibers toward the flared entrance to said passageway from each end thereof;
   said casing having a base and mating top with said guideway comprising grooves in said base;
   first and second leaf springs in recesses in said top for resiliently holding said first and second optical fibers in the guideway of said casing.

3. The jointing device of claim 2 adapted to receive first and second optical fibers which are buffer covered except in the ends where a glass center thereof is exposed for insertion into said passageway in that:
   said grooves are sufficiently deep to permit the glass center to lie entirely therein; and
   said leaf springs are wider than the width of said grooves whereby said leaf springs need not contact said glass center during fiber insertion through said grooves into said passageway.

4. The jointing device of claim 3 wherein said leaf springs are adapted to contact the fibers in said grooves at locations remote from said flared entrance to said passageway to avoid deflection of said optical fibers out of said grooves.

5. A thermally actuated fiber optic jointing device comprising:
a flexible collar;
a plurality of generally V-shaped vanes within said collar positioned with apexes thereof facing inward to form a passageway selectively expandable against the flex of said collar in response to a condition to permit the insertion into said passageway of first and second optical fibers from opposite ends with said passageway contracting with the removal of said condition to grasp said optical fibers between the apexes of said vanes;
the surfaces of said vanes at the ends thereof, in the portions defining said passageway, being individually sloped away from said passageway and being cooperative to provide a segmented conical flare at the entrance to said passageway,
a cylindrical housing surrounding said collar at a distance to limit the expansion of said passageway against the flex of said collar to a predetermined size.

6. A thermally actuated fiber optic jointing device comprising:
a flexible collar;
a plurality of generally V-shaped vanes within said collar positioned with apexes thereof facing inward to form a passageway selectively expandable against the flex of said collar in response to a condition to permit the insertion into said passageway of first and second optical fibers from opposite ends with said passageway contracting with the removal of said condition to grasp said optical fibers between the apexes of said vanes;
a cylindrical housing surrounding said collar at a distance to limit the expansion of said passageway against the flex of said collar to a predetermined size.

7. The jointing device of claim 6 further including:
a casing for holding said housing;
said casing including a grooved guideway for directing said first and second optical fibers toward said passageway.

8. The jointing device of claim 7 wherein said casing at locations of said guideway remote from said passageway includes angled shoulders defining entrances to said guideway.

9. The jointing device of claim 7 further including means for resiliently holding said first and second optical fibers in the guideway of said casing.

10. The jointing device of claim 9 wherein said casing includes a base and mating top with said guideway comprising grooves in said base and said holding means including first and second leaf springs set in recesses in said top.

11. The jointing device of claim 10 adapted to receive first and second optical fibers which are buffer covered except in the ends where a glass center thereof is exposed for insertion into said passageway in that:
said grooves are sufficiently deep to permit the glass center to lie entirely therein; and
said leaf springs are wider than the width of said grooves whereby said leaf springs need not contact said glass center during fiber insertion through a groove into said passageway.

12. The jointing device of claim 11 wherein said leaf springs are adapted to contact the fibers in said grooves at locations a distance back from said passageway to avoid deflection of said optical fibers out of said grooves.

13. The jointing device of claim 7 wherein said casing is adapted to retain said housing in a predetermined position to align said passageway in the expanded condition with the location of a fiber in said guideway.

14. The jointing device of claim 7 wherein said condition is heat and said casing is apertured to permit the application of a heat supplying tool to said housing.

15. The jointing device of claim 14 wherein said housing is a heat conducting material and said casing is of a heat deflecting material.

16. The jointing device of claim 6 wherein said vanes have a shape memory property activated by heat to assume a less sharply angled V-shape.

17. The jointing device of claim 6 further including a resilient coating on the surface of said vanes at the apexes facing said passageway which deforms against the pressure of said first and second optical fibers inserted in said passageway when said passageway is contracted.

18. The jointing device of claim 6 wherein said vanes are formed of a nickel-titanium alloy.

19. A thermally actuated fiber optic jointing device comprising:
a flexible collar;
a plurality of generally V-shaped vanes within said collar positioned with apexes thereof facing inward to form a passageway selectively expandable against the flex of said collar in response to a condition to permit the insertion into said passageway of first and second optical fibers from opposite ends with said passageway contracting with the removal of said condition to grasp said optical fibers between the apexes of said vanes;
a resilient coating on the surface of said vanes at the apexes facing said passageway which deforms against the pressure of said first and second optical fibers inserted in said passageway when said passageway is contracted to precisely align said fibers.

20. The jointing device of claim 19 wherein said coating is plastic.

21. The jointing device of claim 20 wherein said plastic is Tetrafluoroethylene.

22. The jointing device of claim 19 wherein said vanes are formed by a nickel-titanium alloy.

23. A thermally actuated fiber optic jointing device comprising:
a flexible collar;
a plurality of generally V-shaped vanes within said collar positioned with apexes thereof facing inward to form a passageway selectively expandable against the flex of said collar in response to a condition to permit the insertion into said passageway of first and second optical fibers from opposite ends with said passageway contracting with the removal of said condition to grasp said optical fibers between the apexes of said vanes;
a removable casing for holding said collar, said casing including a base and mating top with a guideway comprising grooves in said base for directing said first and second optical fibers toward said passageway;

means for resiliently holding said first and second optical fibers in the guideway of said casing;

said holding means having first and second leaf springs set in recesses in said top.

24. The jointing device of claim 23 adapted to receive first and second optical fibers which are buffer covered except in the ends where a glass center thereof is exposed for insertion into said passageway in that:

said grooves are sufficiently deep to permit the glass center to lie entirely therein; and said leaf springs are wider than the width of said grooves whereby said leaf springs need not contact said glass center during fiber insertion through a groove into said passageway.

25. The jointing device of claim 24 wherein said leaf springs are adapted to contact the fibers in said grooves at locations remote from said passageway to avoid deflection of said optical fibers out of said grooves.

26. A thermally actuated fiber optic jointing device comprising:

a flexible collar;

a plurality of generally V-shaped vanes within said collar positioned with apexes thereof facing inward to form a passageway selectively expandable against the flex of said collar in response to a condition to permit the insertion into said passageway of first and second optical fibers from opposite ends with said passageway contracting with the removal of said condition to grasp said optical fibers between the apexes of said vanes;

a removable casing for holding said collar, said casing including a base and mating top with a guideway comprising grooves in said base for directing said first and second optical fibers toward said passageway;

a resilient coating on the surface of said vanes at the apexes facing said passageway which deforms against the pressure of said first and second optical fibers inserted in said passageway when said passageway is contracted.

* * * * *